US010698259B2

(12) United States Patent
Son et al.

(10) Patent No.: US 10,698,259 B2
(45) Date of Patent: Jun. 30, 2020

(54) DEFORMED LIQUID CRYSTAL DISPLAY DEVICE

(71) Applicant: LG DISPLAY CO., LTD., Seoul (KR)

(72) Inventors: Yeong-Eun Son, Paju-si (KR); Su-Jin Chang, Paju-si (KR); Dong-Seok Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 16/185,574

(22) Filed: Nov. 9, 2018

(65) Prior Publication Data

US 2019/0146278 A1    May 16, 2019

(30) Foreign Application Priority Data

Nov. 13, 2017  (KR) .................. 10-2017-0150607

(51) Int. Cl.
*G02F 1/1333*     (2006.01)
*G02F 1/13357*    (2006.01)

(52) U.S. Cl.
CPC .. *G02F 1/133606* (2013.01); *G02F 1/133308* (2013.01); *G02F 1/133603* (2013.01); *G02F 1/133605* (2013.01); *G02F 1/133608* (2013.01); *G02F 1/133611* (2013.01); *G02F 2001/133317* (2013.01); *G02F 2001/133612* (2013.01); *G02F 2201/56* (2013.01)

(58) Field of Classification Search
CPC ........... G02F 2201/56; G02F 1/133605; G02F 1/133606; G02F 1/133611; G02B 6/0045
See application file for complete search history.

(56) References Cited

U.S. PATENT DOCUMENTS

| | | | |
|---|---|---|---|
| 2007/0230206 A1 | 10/2007 | Hsiao et al. | |
| 2009/0316430 A1* | 12/2009 | Chuang | G02B 3/0043 362/606 |
| 2010/0150509 A1* | 6/2010 | Lin | G02B 6/0053 385/129 |
| 2010/0289994 A1* | 11/2010 | Nonaka | G02F 1/133514 349/108 |
| 2015/0163928 A1* | 6/2015 | Cho | G02F 1/133608 362/97.1 |
| 2015/0261043 A1* | 9/2015 | Lee | G02F 1/133308 349/58 |
| 2015/0309366 A1 | 10/2015 | Park et al. | |

(Continued)

FOREIGN PATENT DOCUMENTS

| | | |
|---|---|---|
| JP | 2013-61562 A | 4/2013 |
| JP | 2017-146333 A | 8/2017 |

*Primary Examiner* — Michael H Caley
*Assistant Examiner* — Mariam Qureshi
(74) *Attorney, Agent, or Firm* — Birch, Stewart, Kolasch & Birch, LLP

(57) ABSTRACT

A deformed liquid crystal display device including a cover bottom; a backlight unit on the cover bottom; the backlight unit including: a LED assembly including a plurality of LEDs; a reflector comprising a bottom surface, and side portions bent upward from edges of the bottom surface; a diffuser, disposed above and spaced apart from the plurality of LEDs and the bottom surface of the reflector; a liquid crystal panel disposed on the backlight unit, wherein the reflector has at least one corner having an acute angle formed by two adjacent side portions, wherein a brightness enhancing portion is disposed at the corner having the acute angle.

17 Claims, 9 Drawing Sheets

(56) References Cited

U.S. PATENT DOCUMENTS

2016/0138779 A1* 5/2016 Oh .................... G02F 1/133603
362/97.1
2017/0235189 A1* 8/2017 Nitanai ............. G02F 1/133605
362/97.1

* cited by examiner

DEFORMED LIQUID CRYSTAL DISPLAY DEVICE

CROSS-REFERENCE TO RELATED APPLICATIONS

The present application claims the priority benefit of Korean Patent Application No. 10-2017-0150607 filed in Korea on Nov. 13, 2017, which is hereby incorporated by reference in its entirety for all purposes as if fully set forth herein.

BACKGROUND

Field of the Invention

The present invention relates to a deformed liquid crystal display device, and more particularly, to a deformed liquid crystal display device in which a dark corner portion is not generated at a corner having an acute angle.

Discussion of the Related Art

Recently, with the development of information technology and mobile communication technology, display devices capable of visually displaying information have been developed. A display device is broadly classified as a non-self luminous display device having a luminescent property and a non-luminous display device on which an image can be displayed by an external factor.

An example of the non-self luminous display device may include a liquid crystal display device (LCD).

Here, the LCD requires a separate light source because the LCD is an element that does not have a self-luminous element. Accordingly, a backlight unit having a light source is provided on a back surface of the LCD to emit light toward a front surface of the LCD, and thus an image that is visible is realized.

The backlight unit uses a cold-cathode fluorescent lamp (CCFL), an external electrode fluorescent lamp (EEFL), a light emitting diode (LED), or the like as a light source.

Specifically, the LED among the above light sources is widely used as a display light source having characteristics of a small size, low power consumption, high reliability, and the like.

The backlight unit is divided into a side light type backlight unit and a direct light type backlight unit according to an arrangement structure of lamps. The side light type backlight unit has a structure in which one lamp or a pair of lamps are arranged at one side of a light guide plate or a structure in which two lamps or two pairs of lamps are arranged at both sides of the light guide plate. The direct light type backlight unit has a structure in which several lamps are arranged below an optical sheet.

Recently, research is being actively conducted on LCDs that are large-sized according to consumer demand, and a direct light type backlight unit is more appropriate for a large-sized LCD than a side light type backlight unit.

Meanwhile, since the LCD is typically formed in a quadrangular or rectangular shape, the backlight unit is also designed to be optimized for the quadrangular or rectangular shape. The LCD is advantageous for high image quality, ultra-thinness, a light weight, and a large size and has advantages of space utilization, interior, and design. The LCD may have various application fields. Recently, there are demands for various shapes of LCDs.

Specifically, in various shapes of LCDs, research is also being actively conducted on a backlight unit for achieving an optimal design corresponding to the shape of the LCD.

SUMMARY

Accordingly, the present invention is directed to a deformed liquid crystal display device that substantially obviates one or more of the problems due to limitations and disadvantages of the related art.

An advantage of the present invention is to provide a deformed liquid crystal display device that can have improved quality of an image.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a deformed liquid crystal display device including a cover bottom; a backlight unit on the cover bottom; the backlight unit including: a LED assembly including a plurality of LEDs; a reflector comprising a bottom surface, and side portions bent upward from edges of the bottom surface; a diffuser, disposed above and spaced apart from the plurality of LEDs and the bottom surface of the reflector; a liquid crystal panel disposed on the backlight unit, wherein the reflector has at least one corner having an acute angle formed by two adjacent side portions, wherein a brightness enhancing portion is disposed at the corner having the acute angle.

It is to be understood that both the foregoing general description and the following detailed description are explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Hereinafter, embodiments of the present invention will be described in detail with reference to the drawings.

Figure 1:
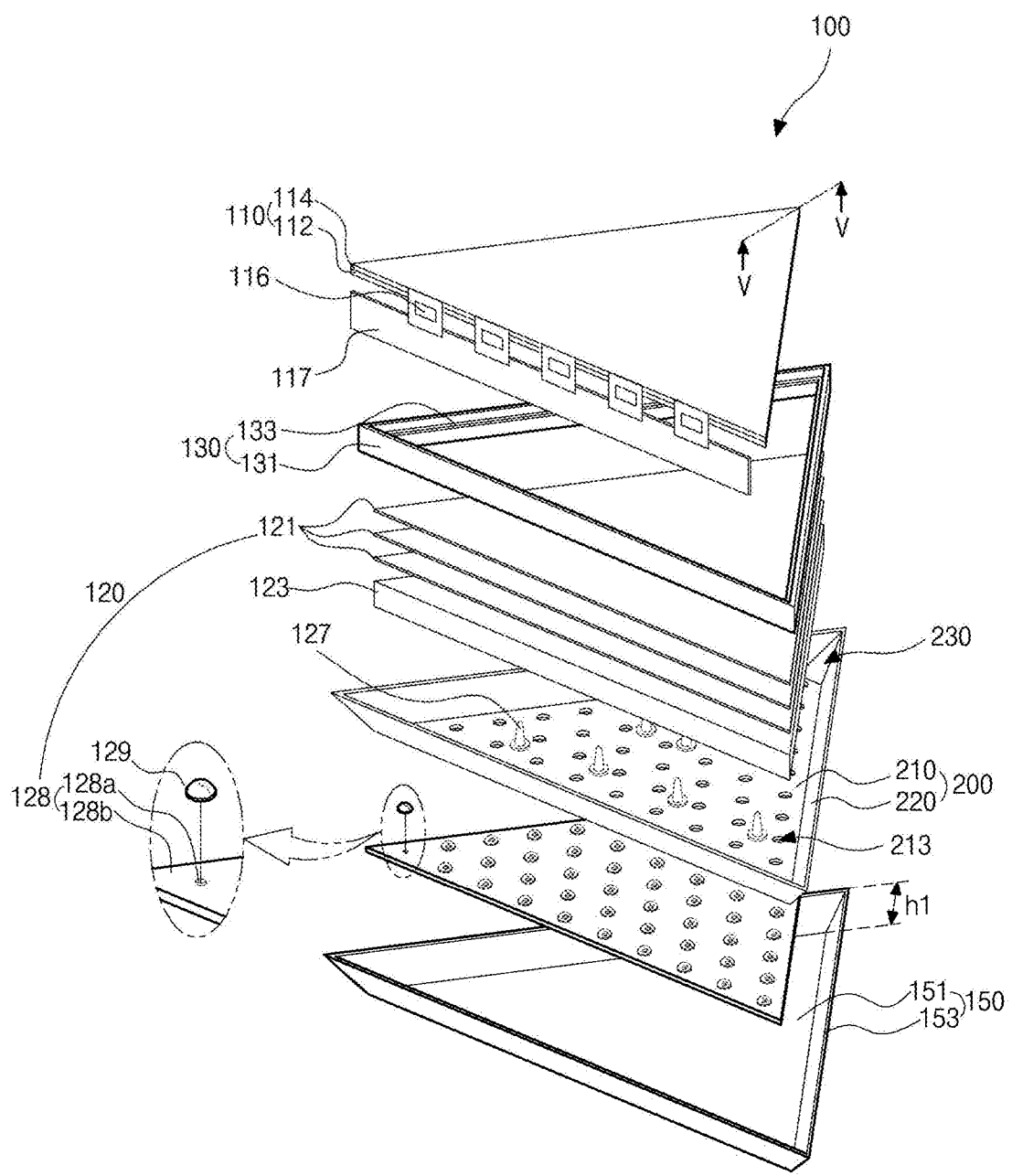
FIG. 1 is an exploded perspective view schematically showing a deformed liquid crystal display device according to an embodiment of the present invention.

FIG. 1 is an exploded perspective view schematically showing a deformed liquid crystal display device according to an embodiment of the present invention.

As shown in the drawing, a deformed liquid crystal display device 100 according to the embodiment of the present invention includes a triangular-shaped liquid crystal panel (hereinafter referred to as a triangular liquid crystal panel) 110 including a corner having an acute angle α (see FIG. 2B), a triangular-shaped backlight unit (hereinafter referred to as a triangular backlight unit) 120 corresponding to the triangular liquid crystal panel 110, and a guide panel 130 and a cover bottom 150, which are used for modularizing the triangular liquid crystal panel 110 and the triangular backlight unit 120. Compared with a usually-used display device having a rectangular shape with each corner at a right angle, the liquid crystal display device 100 of this embodiment is a different or deformed type of display device and is thus referred to as a deformed liquid crystal display device.

In this case, the guide panel 130 and the cover bottom 150 are also formed as a triangular guide panel and a triangular cover bottom, which correspond to the triangular liquid crystal panel 110 and the triangular backlight unit 120, respectively.

Here, in this embodiment, the deformed liquid crystal display device 100 of the triangular shape, which includes the triangular liquid crystal panel 110, the triangular backlight unit 120, the triangular guide panel 130, and the triangular cover bottom 150, is described by way of example. Alternatively, the deformed liquid crystal display device 100 may have any shape with at least one corner having an acute angle α (see FIG. 2B) so that the liquid crystal panel 110 and the backlight unit 120, and the guide panel 130 and the cover bottom 150, which are used for modularizing the liquid crystal panel 110 and the backlight unit 120, may have a shape corresponding to the shape of the deformed liquid crystal display device 100.

In this case, for convenience of description, directions in the drawing are assumed that an outer normal direction of a display surface of the triangular liquid crystal panel 110 is a forward direction. The triangular backlight unit 120 is disposed behind the triangular liquid crystal panel 110. The triangular liquid crystal panel 110 is located in front of the triangular backlight unit 120 in a state in which the triangular guide panel 130 having a triangular frame shape surrounds an outer periphery of the triangular backlight unit 120. The triangular cover bottom 150 is located on a back surface of the triangular backlight unit 120. The triangular liquid crystal panel 110, the triangular backlight unit 120, the triangular guide panel 130, and the triangular cover bottom 150 are combined to be integrated in a front-rear direction.

Each of the above components will be described in more detail.

First, the triangular liquid crystal panel 110 is a core portion for displaying an image, and includes a first substrate 112 and a second substrate 114, which face each other and are bonded with a liquid crystal layer (not shown) interposed therebetween.

In this case, although not clearly shown in the drawing, an active matrix method is assumed to be used. A plurality of gate lines and a plurality of data lines intersect each other on an inner surface of the first substrate 112 which is usually referred to as a lower substrate or an array substrate to define pixels. A thin film transistor (TFT) is provided at each of the intersection points and connected in one-to-one correspondence with a transparent pixel electrode formed in each of the pixels.

A color filter such as a red (R), green (G), or blue (B) filter corresponding to each of the pixels, and a black matrix, which surrounds the color filter and covers non-display elements such as the gate line, the data line, and the TFT, are provided on an inner surface of the second substrate 114, which is referred to as an upper substrate or a color filter substrate. Further, a transparent common electrode which covers the color filter and the black matrix is provided.

In addition, although not clearly shown in the drawing, upper and lower alignment layers (not shown), which define an initial molecular alignment direction of a liquid crystal, may be formed at interfaces between the two substrates 112 and 114 and the liquid crystal layer of the triangular liquid crystal panel 110, and a seal pattern is formed along edges of the two substrates 112 and 114 to prevent leakage of the liquid crystal layer and which fills a gap between the two substrates 112 and 114.

In this case, lower and upper polarizers 119b and 119a (see FIG. 5) are respectively attached to outer surfaces of the first substrate 112 and the second substrate 114.

A printed circuit board (PCB) 117 is connected to one edge among three edges of the triangular liquid crystal panel 110 through a connecting member 116 such as a flexible circuit board. In this case, the connecting member 116 may be attached and connected to a side surface of the one edge of the triangular liquid crystal panel 110.

The triangular backlight unit 120, which supplies light is provided on the back surface of the triangular liquid crystal panel 110 so that a difference in transmittance ratio exhibited by the triangular liquid crystal panel 110 is externally expressed.

The triangular backlight unit 120 includes a light emitting diode (LED) assembly 128 located on the back surface of the triangular liquid crystal panel 110, a reflector 200, which may have a triangular shape, a diffuser 123, which may have a triangular shape and is located on the LED assembly 128 and the reflector 200 and spaced a predetermined interval from the LED assembly 128 and the reflector 200 through at least one guide support 127, and at least one optical sheet 121 located on the diffuser 123 and which may have a triangular shape. The guide support 127 between the diffuser 123 and the reflector 200 may be mounted on one of the reflector 200, the PCB 128b of the LED assembly 128 and the cover bottom 150. In case that the guide support 127 is mounted on the PCB 128b, the reflector 200 may have a through-hole through which the guide support 127 passes. In case that the guide support 127 is mounted on the cover bottom 150, both of the reflector 200 and the PCB 128b may have a through-hole through which the guide support 127 passes. In this embodiment, the guide support 127 being mounted on the reflector 200 is described by way of example.

The LED assembly 128 is a light source of the triangular backlight unit 120, and includes a triangular plate shaped PCB 128b mounted inside a lower surface 151 of the triangular cover bottom 150, and a plurality of LEDs 128a which are spaced a predetermined interval from each other and mounted on the PCB 128b.

In this case, the PCB 128b may be divided into a plurality of plates. In other words, the PCB 128b may be configured with a plurality of plates separated from each other.

In order to improve luminous efficiency and brightness, each of the plurality of LEDs 128a may include a blue LED chip having high luminous efficiency and high brightness, and a phosphor which is, for example, a yellow phosphor made of yttrium aluminum garnet doped with cerium (YAG: Ce).

In this regard, a part of a blue light from the blue LED chip is transmitted through the phosphor and another part of the blue light from the blue LED chip is converted into a yellow light by the phosphor. Thus, the part of the blue light emitted from the LED chip is mixed with the yellow light emitted by the phosphor, and thus white light is finally emitted toward the diffuser 123.

In this case, a light diffusion lens 129 is provided on each of the LEDs 128a.

Here, the reflector 200 includes a plurality of through-holes 213 through which the plurality of LEDs 128a may pass. The reflector 200 covers all of the PCB 128b and the lower surface 151 and a side surface 153 of the triangular cover bottom 150 except the light diffusion lenses 129 so that light directed toward a back surface of each of the plurality of LEDs 128a is reflected toward the diffuser 123 and the optical sheets 121, and thus the brightness of the light is improved. The light diffusion lens 129 on each LED 128a may cover the corresponding through-hole 213.

In this case, a brightness enhancing portion 230 is further provided at a corner of the reflector 200. Accordingly, in the deformed liquid crystal display device including the corner having the acute angle α (see FIG. 2B), a dark portion can be prevented from being generated at the corner. A description thereof will be described below in more detail.

The diffuser 123 and the optical sheets 121 for uniformity of brightness are located on the plurality of LEDs 128a exposed through the through-holes 213 of the reflector 200.

Here, the diffuser 123 and the optical sheets 121 are supported by at least one guide support 127 to prevent sagging. Each of the optical sheets 121 includes a diffusion sheet, at least one condensing sheet, and the like, and diffuses or condenses light passing through the diffuser 123 to make a more uniform surface light source be incident on the triangular liquid crystal panel 110.

In this case, the light diffusion lens 129 located on each of the plurality of LEDs 128a serves to improve a beam angle of light emitted from each of the plurality of LEDs 128a.

Therefore, an effect like a color mixing space being actually increased in the backlight unit 120 can be achieved. The color mixed light is supplied to the triangular liquid crystal panel 110 together with the light reflected by the reflector 200 in the form of a more uniform surface light source in the process of passing through the diffuser 123 and the optical sheets 121.

Further, since the beam angle of the light emitted from the LED 128a is increased, an occurrence of an LED mura phenomenon can be prevented even when a distance between the diffuser 123 and the LED 128a is minimized.

Therefore, the beam angle of the light emitted from each of the plurality of LEDs 128a of the LED assembly 128 is improved through the light diffusion lens 129. The light is processed into uniform high-quality light in the process of sequentially passing through the diffuser 123 and the optical sheets 121, and then is uniformly incident on the entire region of the triangular liquid crystal panel 110. The triangular liquid crystal panel 110 displays a high brightness image on the outside thereof using the light.

The triangular liquid crystal panel 110 and the triangular backlight unit 120 are integrally modularized using the triangular guide panel 130 and the triangular cover bottom 150.

The triangular guide panel 130 has a triangular frame shape, supports the triangular liquid crystal panel 110 and back edges of the diffuser 123 and the optical sheets 121 to distinguish positions of the triangular liquid crystal panel 110 and the triangular backlight unit 120, and maintains an optical gap or an air gap between the LED assembly 128 and the diffuser 123.

That is, the direct light type backlight unit 120 according to the embodiment of the present invention is preferably formed to have the optical gap or air gap G (see FIG. 5) (hereinafter referred to as the optical gap) having a predetermined interval between the LED assembly 128 and the diffuser 123. The optical gap G (see FIG. 5) is a color mixing space of the light emitted from the plurality of LEDs 128a of the LED assembly 128. The optical gap G (see FIG. 5) serves to uniformly mix the colors of the light emitted from the plurality of LEDs 128a and cause the light to be incident on the diffuser 123, or serves to prevent thermal expansion of the diffuser 123 due to high-temperature heat generated from the plurality of LEDs 128a.

The guide panel 130 includes a vertical portion 131. A protruding jaw 133 is provided at an inner side of the vertical portion 131 and serves to maintain an interval between the LED assembly 128 and the diffuser 123 so that the optical gap G (see FIG. 5) is implemented.

The back edges of the diffuser 123 and the optical sheets 121 are supported onto the protruding jaw 133 and attached and fixed thereto. The triangular liquid crystal panel 110 is attached and fixed onto the vertical portion 131 by an adhesive pad 118 (see FIG. 5) such as a double-sided tape.

Further, the triangular cover bottom 150, on which the triangular liquid crystal panel 110 and the triangular backlight unit 120 are mounted and which becomes a base for assembling the entire device of the liquid crystal display device 100, includes the lower surface 151 having a triangular plate shape and the side surface 153 formed by vertically bending the edge of the lower surface 151.

As the triangular cover bottom 150 which covers the back surface of the triangular backlight unit 120 is assembled with the triangular guide panel 130 and is fastened thereto in a state in which the triangular guide panel 130 surrounds the edges of the triangular liquid crystal panel 110 and the triangular backlight unit 120, the triangular guide panel 130 and the triangular cover bottom 150 are integrally modularized.

In this case, the triangular guide panel 130 may be referred to as a support main, a main support, or a mold frame, and the triangular cover bottom 150 may be referred to as a bottom cover or a lower cover.

Figure 2A:
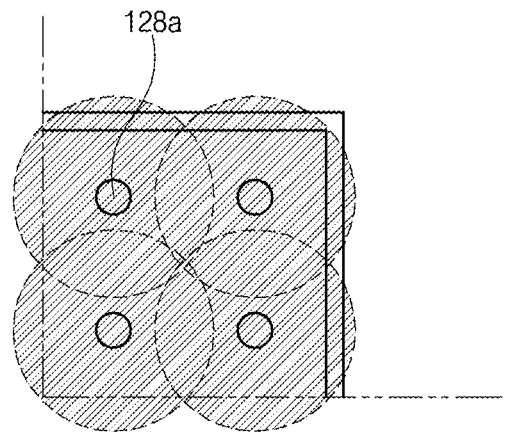
FIGS. 2A and 2B are schematic views for describing a principle of generating a dark portion at a corner having an acute angle.
Figure 2B:
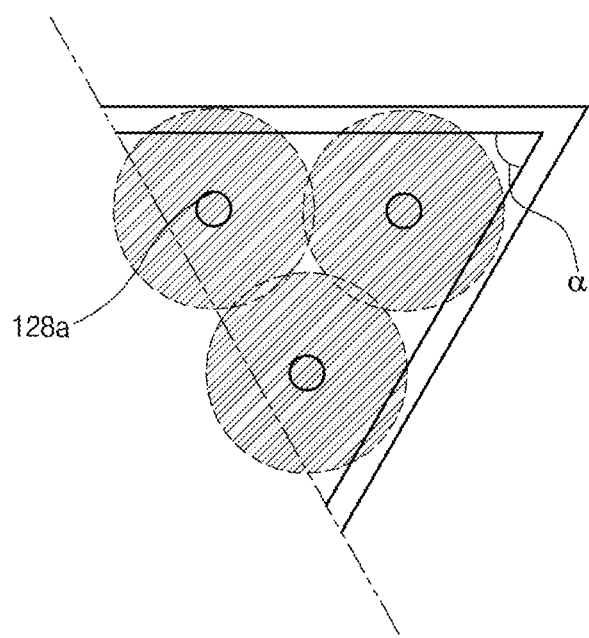

Here, in the deformed liquid crystal display device 100 according to the embodiment of the present invention, since each of the liquid crystal panel 110 and the backlight unit 120 is formed in a triangular shape including a corner having an acute angle α (see FIG. 2B), a dark portion is generated at the corner having the acute angle α (see FIG. 2B). However, in the deformed liquid crystal display device 100 according to the embodiment of the present invention, since a brightness enhancing portion 230 is further provided at a corner of a reflector 200, a dark portion can be prevented from being generated at a corner having an acute angle α (see FIG. 2B) of the deformed liquid crystal display device 100.

Figure 3A:
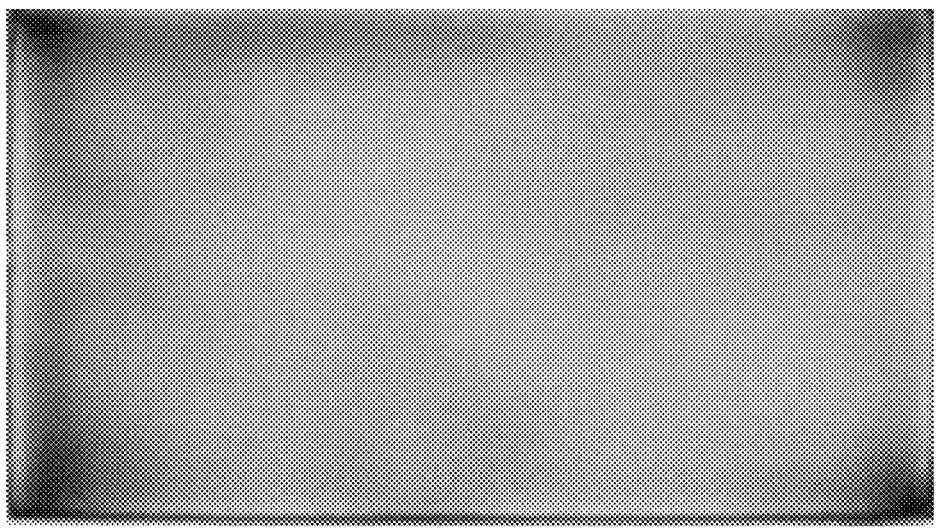
FIG. 3A shows an experimental result of measuring whether a dark portion is generated in a general quadrangular liquid crystal display device.
Figure 3B:
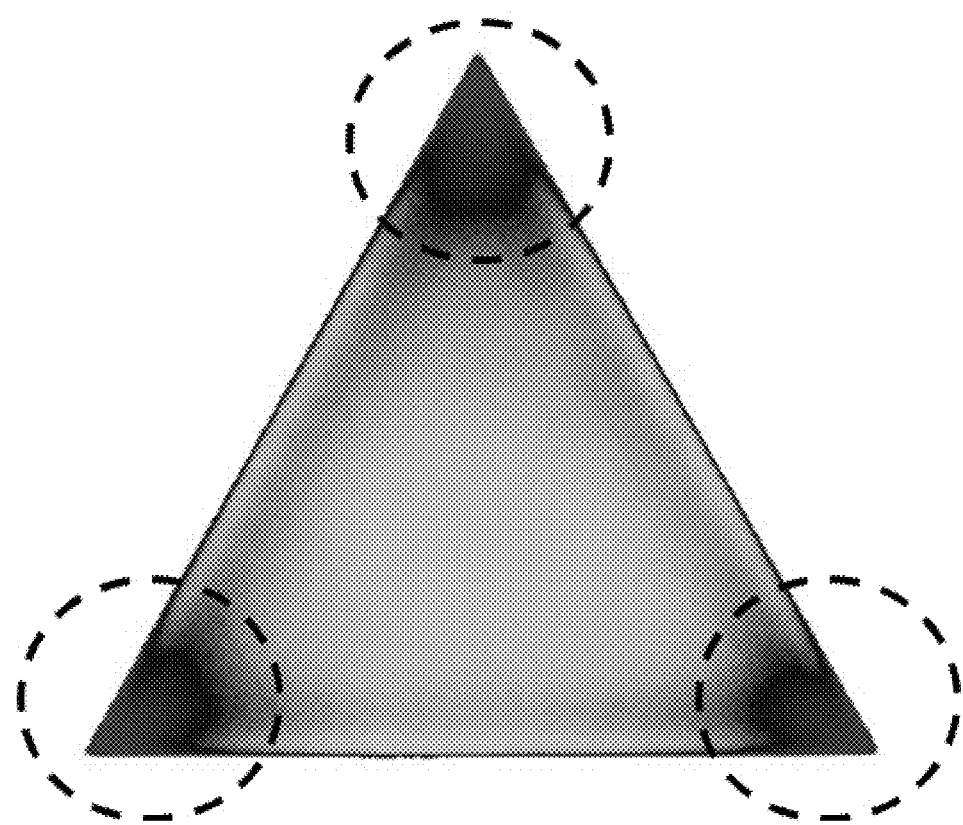
FIG. 3B shows an experimental result of measuring whether a dark portion is generated in a liquid crystal display device including a corner having an acute angle.

FIGS. 2A and 2B are schematic views for describing a principle of generating a dark portion at a corner having an acute angle α, FIG. 3A shows an experimental result of measuring whether a dark portion is generated in a general quadrangular liquid crystal display device, and FIG. 3B shows an experimental result of measuring whether a dark portion is generated in a liquid crystal display device including a corner having an acute angle α.

As shown in FIG. 2A, when the liquid crystal display device is formed in a quadrangular or rectangular shape, light emitted from four LEDs 128a is color-mixed at a corner of the liquid crystal display device, so that the brightness by the four LEDs 128a is ensured.

On the other hand, as shown in FIG. 2B, when the liquid crystal display device includes a corner having an acute angle α, light emitted only from three LEDs 128a is color-mixed at the corner of the liquid crystal display device, so that the brightness only by the three LEDs 128a is ensured.

Therefore, when comparing FIGS. 3A and 3B, it can be confirmed that, as compared with the quadrangular or rectangular liquid crystal display device which ensures the brightness by the four LEDs 128a at the corners thereof, the brightness of the corner of the liquid crystal display device which ensures the brightness only by the three LEDs 128a is lower than the brightness of a central region thereof, and a dark corner portion is formed at the corner having the acute angle α.

The dark corner portion generated at the corner having the acute angle α may lower the image quality of the backlight unit and the liquid crystal display device.

Meanwhile, the number of the LEDs 128a may be increased to remove the dark corner portion. However, when the number of the LEDs 128a is increased, problems of a material cost increase, heat dissipation, and power consumption increase may be caused, and it is disadvantageous in that it is difficult to implement a light-weight, thin-shaped, and narrow bezel which has been recently required.

Figure 4A:
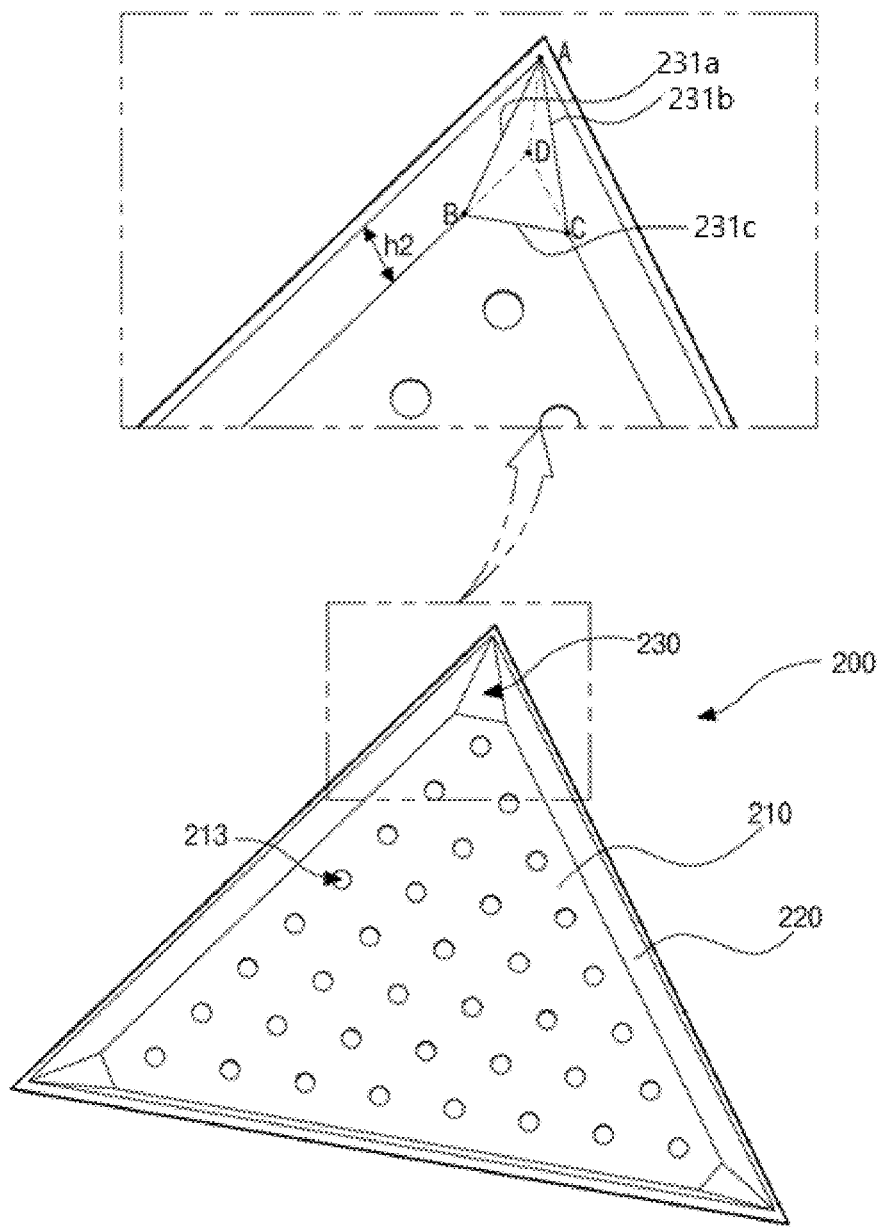
FIG. 4A is a perspective view schematically showing a reflector according to an embodiment of the present invention.
Figure 4B:
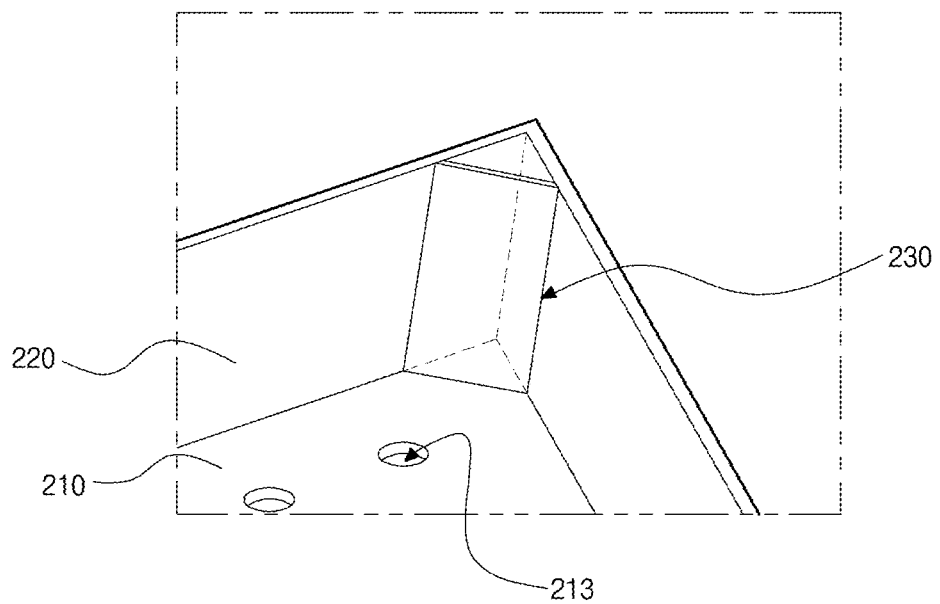
FIGS. 4B to 4D are perspective views schematically showing various shapes of a brightness enhancing portion.
Figure 4C:
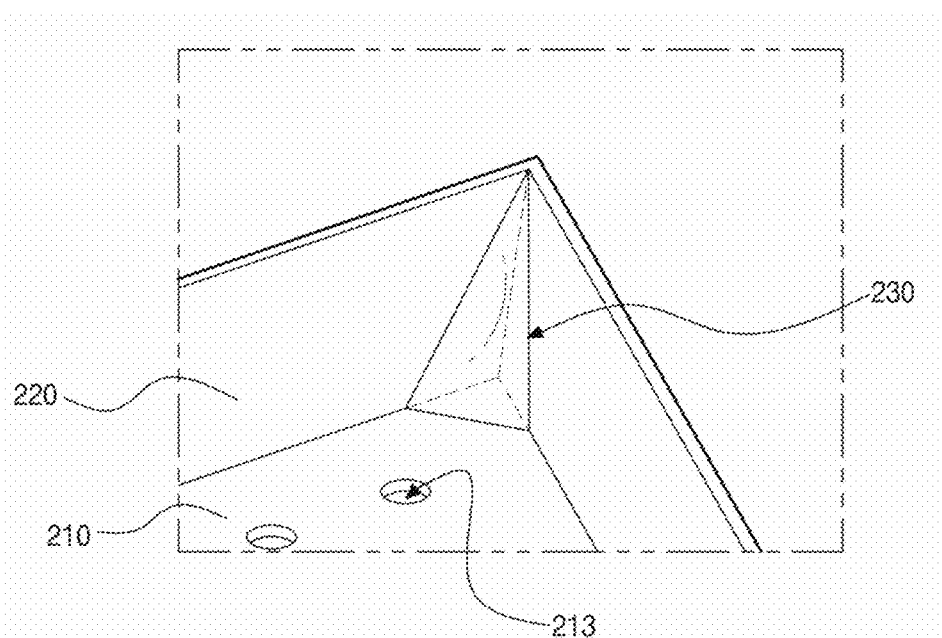
Figure 4D:
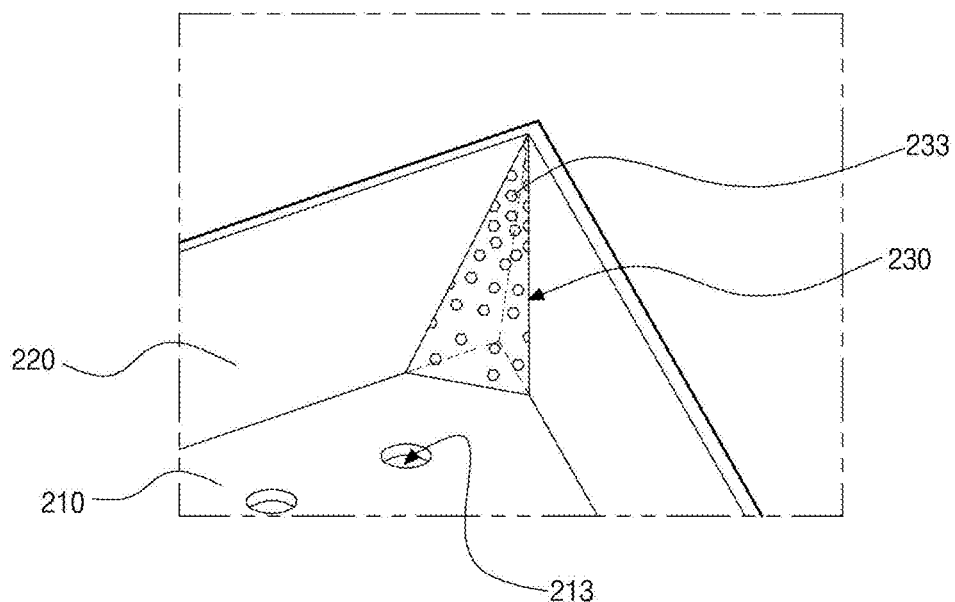

FIG. 4A is a perspective view schematically showing the reflector according to the embodiment of the present invention, and FIGS. 4B to 4D are perspective views schematically showing various shapes of the brightness enhancing portion. For convenience of drawing, the guide support 127 is not illustrated in FIG. 4A.

As shown in FIG. 4A, the reflector 200 according to the embodiment of the present invention includes a bottom surface 210 having a triangular shape and side portions 220 which are bent upward from three edges of the bottom surface 210. The side portions 220 are formed at an obtuse angle with the bottom surface 210 to be inclined constantly from the bottom surface 210.

The through-holes 213 through which the plurality of LEDs 128a (see FIG. 2B) of the triangular backlight unit 120 (see FIG. 1) pass are provided in the bottom surface 210. The reflector 200 has a structure in which a white polyester film having a high reflectivity is stacked on a polyethylene terephthalate (PET) substrate.

In this case, the side portions 220 of the reflector 200 are formed to have a height h2 corresponding to a height h1 of the side surface 153 (see FIG. 1) of the triangular cover bottom 150 (see FIG. 1), and guide (or define) edges of the optical gap G (see FIG. 5) between the diffuser 123 (see FIG. 1) and the optical sheets 121 (see FIG. 1), which are located on the guide panel 130, and the LED assembly 128 (see FIG. 1) located on the lower surface 151 (see FIG. 1) of the triangular cover bottom 150 (see FIG. 1).

Therefore, in a process of emitting the light emitted from the LEDs 128a (see FIG. 2B) of the LED assembly 128 (see FIG. 1) of the triangular backlight unit 120 (see FIG. 1) forward toward the diffuser 123 (see FIG. 1), the light emitted to the side surface rather than toward the front side by the beam angle of the light of the LEDs 128a (see FIG. 2B) is guided by the side portions 220 of the reflector 200 to be guided forward toward the diffuser 123 (see FIG. 1).

Accordingly, the light may also be supplied to the edge region of the triangular liquid crystal panel 110 (see FIG. 1) in which the LEDs 128a (see FIG. 2B) are not actually located, and thus the light may be uniformly supplied to the entire region of the triangular liquid crystal panel 110 (see FIG. 1).

Specifically, the reflector 200 according to the embodiment of the present invention further includes a brightness enhancing portion 230 provided at an inner side of a corner formed by adjacent side portions 220.

The brightness enhancing portion 230 has a triangular shape in a plan view thereof at the corner formed by the adjacent side portions 220, and has an isosceles triangular shape in which two sides 231a and 231b, which correspond to the side portion 220 of the reflector 200, have the same length.

In the brightness enhancing portion 230 having the isosceles triangular shape, a vertex angle A formed by two sides 231a and 231b having the same length is in contact with an upper side corner at which the adjacent side portions 220 are in contact with each other. A base 231c of the brightness enhancing portion 230 is spaced a predetermined interval from a lower side corner D at which the adjacent side portions 220 are in contact with each other, toward a central portion of the bottom surface 210.

In this case, both of the two sides 231a and 231b of the brightness enhancing portion 230 are in direct contact with inner side surfaces of the adjacent side portions 220, so that both side corners B and C of the base 231c are in contact with the inner side surfaces of the adjacent side portions 220.

Therefore, the brightness enhancing portion 230 is also formed at an obtuse angle α' (see FIG. 5) with the bottom surface 210 to be inclined constantly from the bottom surface 210.

In the deformed liquid crystal display device 100 (see FIG. 1) according to the embodiment of the present invention, a dark corner portion can be prevented from being generated at the corner having the acute angle α (see FIG. 2B) using the brightness enhancing portion 230.

More specifically, the deformed liquid crystal display device 100 (see FIG. 1) according to the embodiment of the present invention further includes a brightness enhancing portion 230 provided at a corner formed by two adjacent side portions 220 of the reflector 200, and thus the brightness in this region is improved.

Here, when the brightness enhancing portion 230 is not provided, the light emitted from the LEDs 128a (see FIG. 2B) of the LED assembly 128 (see FIG. 1) adjacent to the corner is reflected in different directions by the two adjacent side portions 220 which are inclined toward different directions, and thus the brightness of the light is reduced.

On the other hand, as described in the embodiment of the present invention, the brightness enhancing portion 230 is provided to correspond to the corner formed by the two adjacent side portions 220, and thus the light emitted from the LEDs 128a (see FIG. 2B) adjacent to the corner is reflected in a uniform direction by the brightness enhancing portion 230 and the brightness in this region is improved.

Accordingly, the dark corner portion can be prevented from being generated at the corner having the acute angle α (see FIG. 2B) of the deformed liquid crystal display device 100 (see FIG. 1).

Here, the brightness enhancing portion 230 may have various shapes such as a right triangular shape and the like according to the height h2 of the side portion 220. The brightness enhancing portion 230 may have any shape within a limit that the base 231c in contact with the bottom surface 210 is spaced apart from the lower side corner D of the adjacent side portions 220 toward the central portion of the bottom surface 210.

That is, as shown in FIG. 4B, the brightness enhancing portion 230 may have a quadrangular shape. As described above, when the brightness enhancing portion 230 is formed in a quadrangular shape, the base 231c is preferably spaced apart from the lower side corner D of the adjacent side portions 220, which is further adjacent to the central portion of the bottom surface 210, in order to implement the same angle α' (see FIG. 5) as that of the brightness enhancing portion 230 having a triangular shape in a process of adjusting the angle α' (see FIG. 5) between the brightness enhancing portion 230 and the bottom surface 210. Therefore, the brightness enhancing portion 230 may be visually recognized at the corner of the deformed liquid crystal display device 100 (see FIG. 1).

Further, as shown in FIG. 4C, the brightness enhancing portion 230 may be formed to have a curved surface which is concave from the front thereof.

As described above, when the brightness enhancing portion 230 has the curved surface which is concave from the front thereof, an amount of light reflected by the brightness enhancing portion 230 may be further increased, and the brightness at the corner of the deformed liquid crystal display device 100 (see FIG. 1) can be further improved.

Further, as shown in FIG. 4D, the brightness enhancing portion 230 may further include a plurality of patterns 233. The patterns 233 may diffuse light more uniformly, reflect the light, and process the light into uniform light.

The pattern 233 may be formed in various forms such as an elliptical pattern, a polygon pattern, a hologram pattern, and the like. A density (or number) of the patterns 233 per unit area may increase from the bottom surface 210 to a top end of the side portion 220, and thus a larger amount of light among the light reflected by the brightness enhancing portion 230 may be scattered and diffused by being closer to the diffuser 123 (see FIG. 1).

Figure 5:
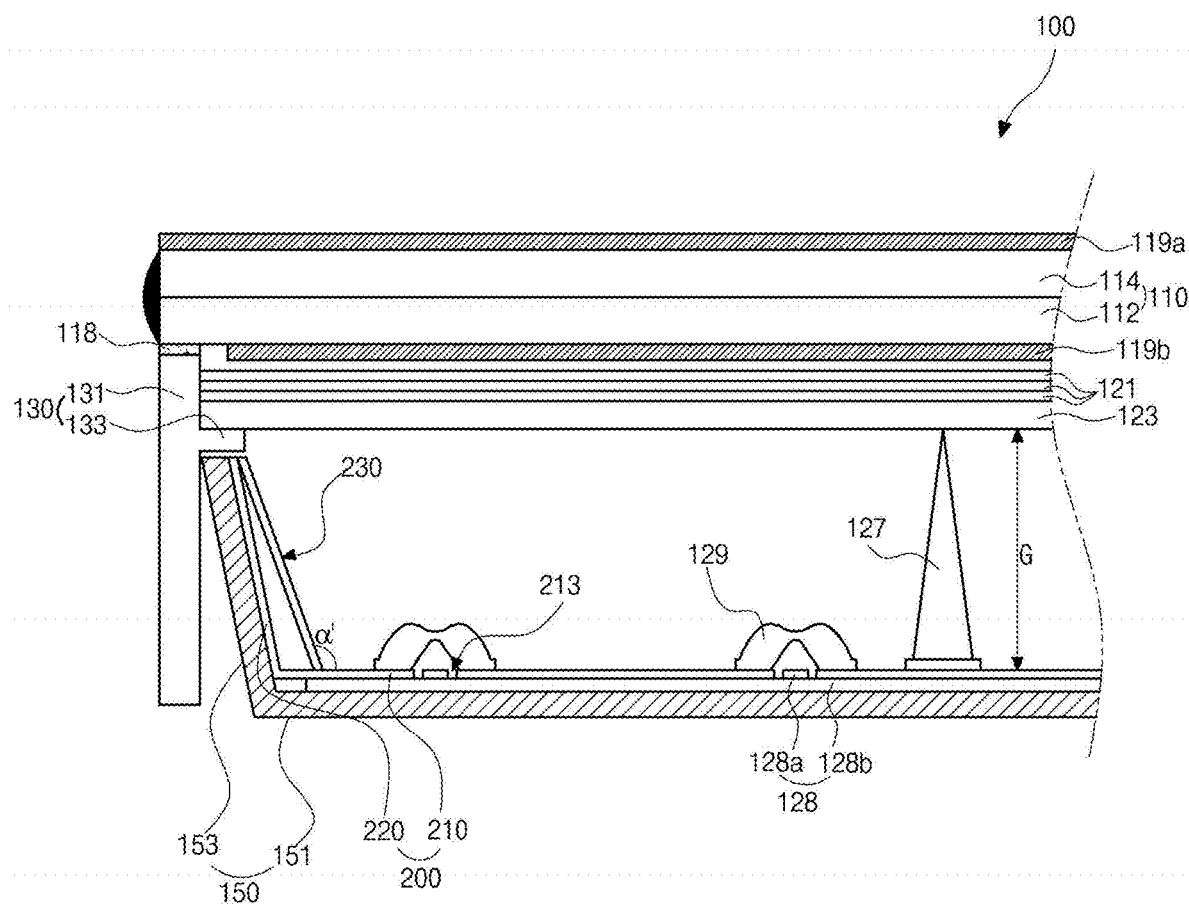
FIG. 5 is a cross-sectional view taken along line V-V of a modularized deformed liquid crystal display shown in FIG. 1.
Figure 6:
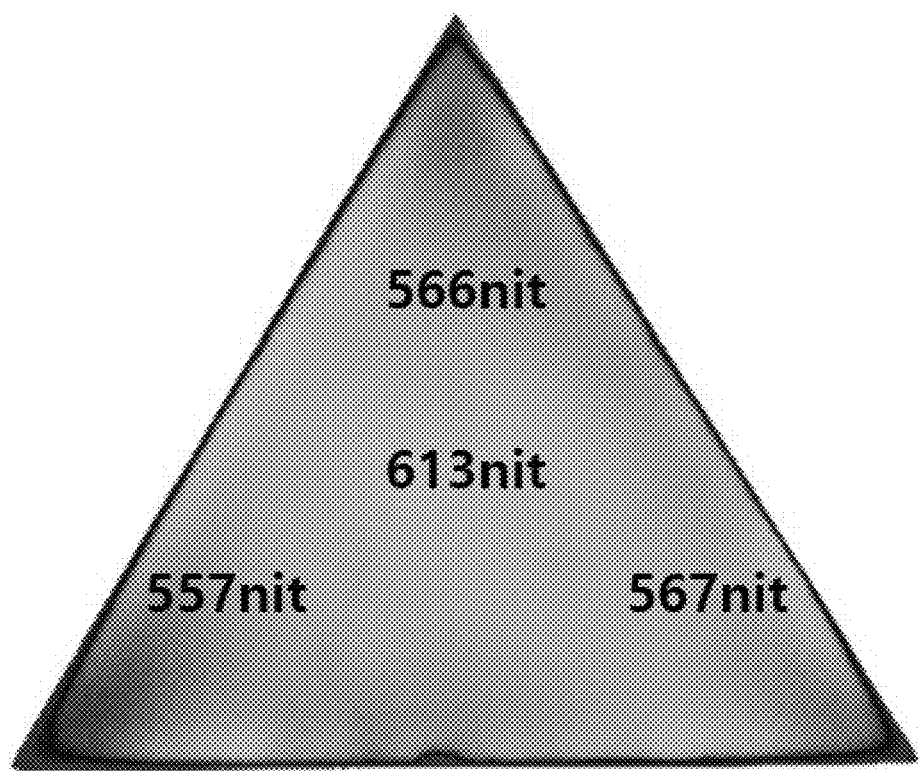
FIG. 6 shows an experimental result of measuring brightness of a deformed liquid crystal display device according to an embodiment of the present invention.

FIG. 5 is a cross-sectional view taken along line V-V of a modularized deformed liquid crystal display shown in FIG. 1, and FIG. 6 shows an experimental result of measuring the brightness of the deformed liquid crystal display device according to the embodiment of the present invention.

As shown in the drawing, the triangular backlight unit 120 (see FIG. 1) is formed by stacking the LED assembly 128 including the PCB 128b having a triangular plate shape, and the plurality of LEDs 128a mounted on the PCB 128b, the light diffusion lens 129 located on the LED 128a to correspond to each of the LEDs 128a, the reflector 200 which exposes the LEDs 128a through the through-hole 213, and the diffuser 123 and the optical sheets 121, which are located on the LED assembly 128. The light diffusion lens 129 on each LED 128a may cover the corresponding through-hole 213.

The triangular liquid crystal panel 110 including the first substrate 112, the second substrate 114, and the liquid crystal layer interposed between the first substrate 112 and the second substrate 114 are located on the triangular backlight unit 120 (see FIG. 1). The polarizers 119a and 119b through which only specific light is selectively transmitted are respectively attached to the outer surfaces of the first and second substrates 112 and 114.

Here, in the triangular liquid crystal panel 110 according to the embodiment of the present invention, the first substrate 112 and the second substrate 114 are formed in the same shape so that edges of the first substrate 112 and the second substrate 114 coincide with each other. A side surface of a pad (not shown) provided at each of ends of a plurality of wirings (not shown) provided on the first substrate 112 may be exposed between side surfaces of the first substrate 112 and the second substrate 114.

The PCB 117 (see FIG. 1) is connected to one side of the triangular liquid crystal panel 110 through the connecting member 116 (see FIG. 1). In this case, the connecting member 116 (see FIG. 1) is attached to the side surface of the triangular liquid crystal panel 110 and connected thereto.

The triangular backlight unit 120 (see FIG. 2) and the triangular liquid crystal panel 110 are integrally modularized using the triangular cover bottom 150 and the triangular guide panel 130.

More specifically, the LED assembly 128 is mounted on the lower surface 151 of the triangular cover bottom 150, the light diffusion lens 129 is located on each of the LEDs 128a of the LED assembly 128, and the reflector 200 is located on the LED assembly 128 to expose the LEDs 128a through the through-hole 213.

The diffuser 123 is located on the LED assembly 128 with a predetermined interval therebetween. In this case, the diffuser 123 is supported by the guide support 127 and the optical sheets 121 are located on the diffuser 123.

Edges of the triangular backlight unit 120 (see FIG. 1) including the LED assembly 128, the diffuser 123, and the optical sheets 121 are surrounded by the triangular guide panel 130. Back edges of the diffuser 123 and the optical sheets 121 are supported by the protruding jaw 133 protruding inward from the vertical portion 131 of the triangular guide panel 130 and the diffuser 123 and the optical sheets 121 are attached and fixed onto the protruding jaw 133.

The triangular liquid crystal panel 110 in which a part of a back edge thereof is supported by the vertical portion 131 of the triangular guide panel 130 is fixedly attached to the vertical portion 131 through the adhesive pad 118.

Here, the back edges of the diffuser 123 and the optical sheets 121 are mounted on and supported by the protruding jaw 133 of the triangular guide panel 130 so that the diffuser 123 and the plurality of LEDs 128a of the LED assembly 128 are spaced at a predetermined interval by the triangular guide panel 130 and the guide support 127, and thus the optical gap G is maintained.

An inner side surface of the vertical portion 131 of the triangular guide panel 130 is in close contact with an outer side surface of the side surface 153 of the triangular cover bottom 150 so that the triangular guide panel 130 and the triangular cover bottom 150 are assembled and fastened to each other. Therefore, the triangular liquid crystal panel 110 and the triangular backlight unit 120 (see FIG. 1) are integrally modularized using the triangular guide panel 130 and the triangular cover bottom 150.

As described above, in the modularized deformed liquid crystal display device 100, the beam angle of the light is improved and the light is guided forward toward the diffuser 123 in a process of passing the light emitted from the plurality of LEDs 128a of the triangular backlight unit 120 (see FIG. 1) through the light diffusion lens 129, and the light is provided to the triangular liquid crystal panel 110 in the form of a uniform surface light source in a process of passing the light through the diffuser 123 and the optical sheets 121.

The light guided toward the back surface of the LED 128a among the light emitted from the plurality of LEDs 128a is reflected by the bottom surface 210 of the reflector 200 and is guided toward the triangular liquid crystal panel 110 located in front of the LED 128a, and thus the brightness of the light is improved.

In this case, some light among the light reflected by the bottom surface 210 of the reflector 200 may be reflected toward the side surface rather than in a direction toward the triangular liquid crystal panel 110. Further, the beam angle of the light emitted from the LED 128a is widened by the light diffusion lens 129 so that the light is guided toward the side surface of the light diffusion lens 129. As described above, the light reflected or guided toward the side surface is also reflected by the side portion 220 of the reflector 200 and is guided toward the diffuser 123 and the optical sheets 121, and thus the brightness of the light is improved.

The light reflected by the side portion 220 of the reflector 200 may be supplied to the edges of the triangular liquid crystal panel 110 so that the light may be uniformly supplied to the entire region of the triangular liquid crystal panel 110.

Specifically, the deformed liquid crystal display device 100 according to the embodiment of the present invention further includes the brightness enhancing portion 230 at the corner formed by two adjacent side portions 220 of the reflector 200 corresponding to the corner having the acute angle α (see FIG. 2B).

The brightness enhancing portion 230 provided in the reflector 200 may reflect light emitted from adjacent LEDs 128a of the LED assembly 128 in a uniform direction, and thus the brightness of the light at the corner having the acute angle α (see FIG. 2B) can be improved.

Accordingly, a dark corner portion can be prevented from being generated at the corner of the deformed liquid crystal display device 100.

Referring to FIG. 6 which shows the experimental result of measuring brightness of the deformed liquid crystal display device 100 according to the embodiment of the present invention, it can be confirmed that, in the deformed liquid crystal display device 100 including the corner having the acute angle α (see FIG. 2B), the brightness at the corner does not largely differ from the brightness in the central region.

When the experimental result in FIG. 6 is compared with that in FIG. 3B, the deformed liquid crystal display device 100 according to the embodiment of the present invention includes the brightness enhancing portion 230 at the corner of the reflector 200 a dark corner portion is not generated at the corner, and thus the dark corner portion can be prevented from being substantially generated at the corner.

In this case, an angle α' formed by the brightness enhancing portion 230 and the bottom surface 210 may be equal to an angle formed by the bottom surface 210 and the side portion 220, or may be greater than the angle formed by the bottom surface 210 and the side portion 220.

Here, the angle α' formed by the brightness enhancing portion 230 and the bottom surface 210 may be flexibly determined according to the size of the reflector 200 or the like. In this case, the obtuse angle α' formed by the brightness enhancing portion 230 and the bottom surface 210 preferably ranges from 110° to 150°.

When the angle α' formed by the brightness enhancing portion 230 and the bottom surface 210 is 110° or lower, the light emitted from the plurality of LEDs 128a of the triangular backlight unit 120 (see FIG. 1) may not be guided toward the triangular liquid crystal panel 110. That is, since the light reflected by the brightness enhancing portion 230 may be reflected toward a direction of the reflector 200 rather than toward the triangular liquid crystal panel 110, the brightness enhancing portion 230 preferably has the angle α' of 110° or higher formed with the bottom surface 210.

Further, when the obtuse angle α' formed by the brightness enhancing portion 230 and the bottom surface 210 is 150° or higher, a dark corner portion is still generated at the corner, so that the significance of forming the brightness enhancing portion 230 substantially disappears.

As described above, the deformed liquid crystal display device 100 according to the embodiment of the present invention further includes the brightness enhancing portion 230 at a corner formed by two adjacent side portions 220 of the reflector 200 of the triangular backlight unit 120 (see FIG. 1), and thus a dark corner portion can be prevented from being generated at the corner having the acute angle α (see FIG. 2B).

Accordingly, it is not necessary to increase the number of LEDs 128a in order to remove the dark corner portion. Therefore, the present invention provides a light-weight, thin-shaped, and narrow bezel which reduces material costs and power consumption.

Meanwhile, the guide panel 130 according to the embodiment of the present invention may be made of a molded material or made by extruding metal, such as aluminum. The protruding jaw 133 may be omitted, and both of the diffuser 123 and the liquid crystal panel 110 may be attached and fixed onto the vertical portion 131.

In this case, an adhesive member (not shown) may be interposed between the diffuser 123 and the liquid crystal panel 110.

Further, the optical sheets 121 on the diffuser 123 may be omitted, and the diffuser 123 may be made of a composite optical sheet in which condensing performance and diffusing performance are combined.

The deformed liquid crystal display device 100 according to the embodiment of the present invention may be applied to a multi-display device such as a video wall for connecting a plurality of liquid crystal display devices in a tiled form, or a stereoscopic display device for realizing an image in a 360° direction.

As described above, according to the present invention, in the deformed liquid crystal display device including the corner having the acute angle, a brightness enhancing portion is further provided at a corner formed by two adjacent side portions of a reflector, so that a dark corner portion can be prevented from being generated at the corner having the acute angle.

Accordingly, it is not necessary to increase the number of LEDs in order to remove the dark corner portion. Therefore, a light-weight, thin-shaped, and narrow bezel can be implemented, and a problem of increased material costs and increased power consumption can also be addressed.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A deformed liquid crystal display device, comprising:
a cover bottom;
a backlight unit on the cover bottom, the backlight unit including:
a light emitting diode (LED) assembly including a plurality of LEDs;
a reflector comprising a bottom surface being substantially planar, and side portions extending along a periphery of the bottom surface and bent upward from edges of the bottom surface to form an obtuse angle with the bottom surface; and
a diffuser disposed above and spaced apart from the plurality of LEDs and the bottom surface of the reflector; and
a liquid crystal panel disposed on the backlight unit,
wherein the reflector has at least one corner having an acute angle formed by two adjacent side portions,
wherein a brightness enhancing portion is disposed at the corner having the acute angle, and
wherein the brightness enhancing portion has a triangular shape, with one vertex of the triangular shape located on an intersection line of the two adjacent side portions of the reflector, and other two vertexes of the triangular shape located, respectively, on intersection lines of the bottom surface and the two adjacent side portions of the reflector.

2. The deformed liquid crystal display device of claim 1, wherein the brightness enhancing portion is inclined to form an obtuse angle with the bottom surface of the reflector.

3. The deformed liquid crystal display device of claim 2, wherein the obtuse angle of the brightness enhancing portion is between 110° to 150°.

4. The deformed liquid crystal display device of claim 1, wherein the brightness enhancing portion further includes a pattern for diffusing light.

5. The deformed liquid crystal display device of claim 1, wherein the brightness enhancing portion is formed to have a curved surface which is concave from the front thereof.

6. The deformed liquid crystal display device of claim 1, wherein an angle formed by the brightness enhancing portion and the bottom surface of the reflector is equal to or greater than the obtuse angle formed by the bottom surface and the two adjacent side portions of the reflector.

7. The deformed liquid crystal display device of claim 1, wherein the reflector has a triangular shape with three corners each having the acute angle, and the brightness enhancing portion is disposed at at least one of the three corners of the reflector having the triangular shape.

8. The deformed liquid crystal display device of claim 1, wherein the bottom surface includes a plurality of through-holes through which the plurality of LEDs pass.

9. The deformed liquid crystal display device of claim 1, wherein a light diffusion lens is provided on each of the plurality of LEDs.

10. The deformed liquid crystal display device of claim 1, wherein the cover bottom includes a lower surface and side surfaces bend upward from edges of the lower surface.

11. The deformed liquid crystal display device of claim 1, wherein a plurality of guide supports are disposed between the diffuser and the bottom surface of the reflector.

12. The deformed liquid crystal display device of claim 1, wherein the backlight unit further includes a guide panel that includes a vertical portion and a protruding jaw provided at an inner side of the vertical portion, wherein the protruding jaw is supported on the side surface of the cover bottom,
wherein back edges of the diffuser are supported onto the protruding jaw, and
wherein the liquid crystal panel is supported onto the vertical portion.

13. A deformed liquid crystal display device, comprising:
a cover bottom;
a backlight unit on the cover bottom, the backlight unit including:
a light emitting diode (LED) assembly including a plurality of LEDs;
a reflector comprising a bottom surface being substantially planar, and side portions extending along a periphery of the bottom surface and bent upward from edges of the bottom surface to form an obtuse angle with the bottom surface; and
a diffuser disposed above and spaced apart from the plurality of LEDs and the bottom surface of the reflector; and
a liquid crystal panel disposed on the backlight unit,
wherein the reflector has at least one corner having an acute angle formed by two adjacent side portions,
wherein a brightness enhancing portion is disposed at the corner having the acute angle, and
wherein the brightness enhancing portion have a quadrangular shape, with two vertexes of the quadrangular located, respectively, on the intersection lines of the bottom surface and the two adjacent side portions of the reflector, other two vertexes of the quadrangular located, respectively, on the edges of the two adjacent side portions of the reflector.

14. A deformed liquid crystal display device including at least one corner having an acute angle, the device comprising:
a triangular backlight unit including:
a light emitting diode (LED) assembly having a plurality of LEDs;
a diffuser located on and spaced apart from the plurality of LEDs; and
a reflector located below the plurality of LEDs;
a triangular liquid crystal panel located on the backlight unit;
a guide panel configured to surround edges of the liquid crystal panel and the backlight unit; and
a cover bottom having a lower surface on which the liquid crystal panel and the backlight unit are mounted,
wherein the reflector includes:
a bottom surface being substantially planar and having a plurality of through holes, wherein the plurality of through holes extend only through the bottom surface;
side portions extending along a periphery of the bottom surface and bent upward from the bottom surface to form an obtuse angle with the bottom surface; and
brightness enhancing portions, each brightness enhancing portion being provided at a respective reflector corner formed by two adjacent side portions,
wherein each brightness enhancing portion includes:
two sides in contact with the two adjacent side portions; and
a base in contact with the bottom surface, and
wherein each brightness enhancing portion has a triangular shape in a plan view thereof,
wherein a vertex angle formed by the two sides of the respective brightness enhancing portion is in contact with an upper side corner at which the respective two adjacent side portions are in contact with each other, and wherein the base is spaced apart from a respective lower side corner, at which the respective two adjacent side portions are in contact with each other, toward a respective central portion of the bottom surface.

15. The deformed liquid crystal display device of claim 14, wherein the LED assembly further includes a triangular shaped PCB, and wherein the PCB comprises a plurality of plates.

16. The deformed liquid crystal display device of claim 14, wherein the backlight unit includes a plurality of light diffusion lenses, each light diffusion lens being provided on a respective LED, wherein the reflector comprises a plurality of through-holes, and wherein each light diffusion lens passes through a respective through-hole of the reflector.

17. The deformed liquid crystal display device of claim 14, wherein angles formed by the brightness enhancing portions and the bottom surface of the reflector are equal to or greater than the obtuse angle formed by the bottom surface and the side portions of the reflector.

* * * * *